(12) United States Patent
Agarwal

(10) Patent No.: US 12,067,143 B2
(45) Date of Patent: Aug. 20, 2024

(54) VISUAL HACKING PREVENTION OF A MOBILE DEVICE

(71) Applicant: Visa International Service Association, San Francisco, CA (US)

(72) Inventor: Ved Prakash Sajjan Kumar Agarwal, Dubai (AE)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 578 days.

(21) Appl. No.: 17/188,888

(22) Filed: Mar. 1, 2021

(65) Prior Publication Data

US 2022/0277101 A1  Sep. 1, 2022

(51) Int. Cl.
| | |
|---|---|
| *G06F 21/62* | (2013.01) |
| *G06F 3/14* | (2006.01) |
| *G06N 20/00* | (2019.01) |
| *G06Q 20/36* | (2012.01) |
| *G06V 40/16* | (2022.01) |
| *H04N 7/18* | (2006.01) |

(52) U.S. Cl.
CPC ............ *G06F 21/6245* (2013.01); *G06F 3/14* (2013.01); *G06N 20/00* (2019.01); *G06Q 20/36* (2013.01); *G06V 40/161* (2022.01); *H04N 7/183* (2013.01)

(58) Field of Classification Search
None
See application file for complete search history.

(56) References Cited

U.S. PATENT DOCUMENTS

| | | | |
|---|---|---|---|
| 9,443,102 B2* | 9/2016 | Cohen | G06F 3/012 |
| 10,380,377 B2 | 8/2019 | Kaladgi | |
| 10,853,469 B1 | 12/2020 | McNamara | |
| 10,893,043 B1 | 1/2021 | John | |
| 2014/0201844 A1* | 7/2014 | Buck | G06F 21/554 726/26 |
| 2015/0143066 A1 | 5/2015 | Kiselev | |
| 2017/0040002 A1 | 2/2017 | Basson | |
| 2017/0076077 A1* | 3/2017 | Zhao | G06F 21/32 |
| 2020/0226966 A1 | 7/2020 | Shin | |

* cited by examiner

*Primary Examiner* — Brandon Hoffman
(74) *Attorney, Agent, or Firm* — Schwabe Williamson & Wyatt, PC

(57) ABSTRACT

Protecting a mobile device from visual hacking comprises analyzing a displayed window/page containing data fields and parsing the fields to identify when sensitive information is displayed. Data from a gyroscope of the mobile device is used to detect roll and pitch viewing angles of the mobile device, data from a proximity sensor is used to detect a distance between the mobile device and the user, and a camera is used to take an image of the user and detect a number of faces visible in the image. The sensitive information is obscured when any predefined conditions are not met, including: determining that the roll and pitch viewing angles are not within pitch and roll threshold values, or that the detected distance is not within distance threshold values, or that more than a single face is detected in the image.

20 Claims, 8 Drawing Sheets

VISUAL HACKING PREVENTION OF A MOBILE DEVICE

BACKGROUND

The disclosure relates to mobile devices, and in particular, to processes for preventing visual hacking of sensitive information displayed on mobile devices by persons other than the user.

The number of tablet users is estimated well over 1 billion, and the number of smartphone users worldwide is estimated to surpass three billion with future growth of several hundred million in the next few years. Many of these user use such mobile devices as replacement for desktops or laptops and perform operations on the devices, such as online banking, trading stocks, and online shopping. These use cases require the display and entry of sensitive or confidential user information such as account numbers, birthdates, social security numbers, authentication information, and the like.

Unfortunately, as the use of mobile devices has grown, so has incidences of shoulder surfing whereby a third party uses direct observation (e.g., looking over the user's shoulder) of displayed information on the mobile device to get sensitive information without the user's permission. Shoulder surfing is an effective way to get information in crowded places because it's relatively easy to stand next to a user of a mobile device and watch as the user fills out or views a form or screen containing sensitive information.

BRIEF SUMMARY

Embodiment provide methods and systems for preventing visual hacking of a mobile device. The disclosed embodiments include a processor of a mobile device executing an anti-hacking application, which when executed is configurable to causes the processor to parse a window or page having one or more fields displayed on the screen, and use labels of the fields to classify the window or page as having one or more fields that display sensitive information. The application accesses data from a gyroscope of the mobile device to detect roll and pitch viewing angles of the screen of the mobile device. The application accesses data from a proximity sensor to detect a distance between the screen of the mobile device and a face of the user. The application activates a camera to take an image of the user and detect a number of faces visible in the image. At least a portion of the sensitive information to be displayed is obscured in the fields responsive to: determine that the roll and pitch viewing angles are not within pitch and roll threshold values, or that the detected distance between the screen of the mobile device and the face of the user is not within distance threshold values, or that are multiple faces detected in the image. Otherwise, if all the conditions are met the window or page is enabled to display the sensitive information in the fields to the user.

According to the methods and systems disclosed herein, by automatically obscuring sensitive information in unsafe viewing environments, the visual threat detection application protects the sensitive information from unauthorized access through third-party shoulder surfing and maintains information security.

DETAILED DESCRIPTION

Figure 1A:
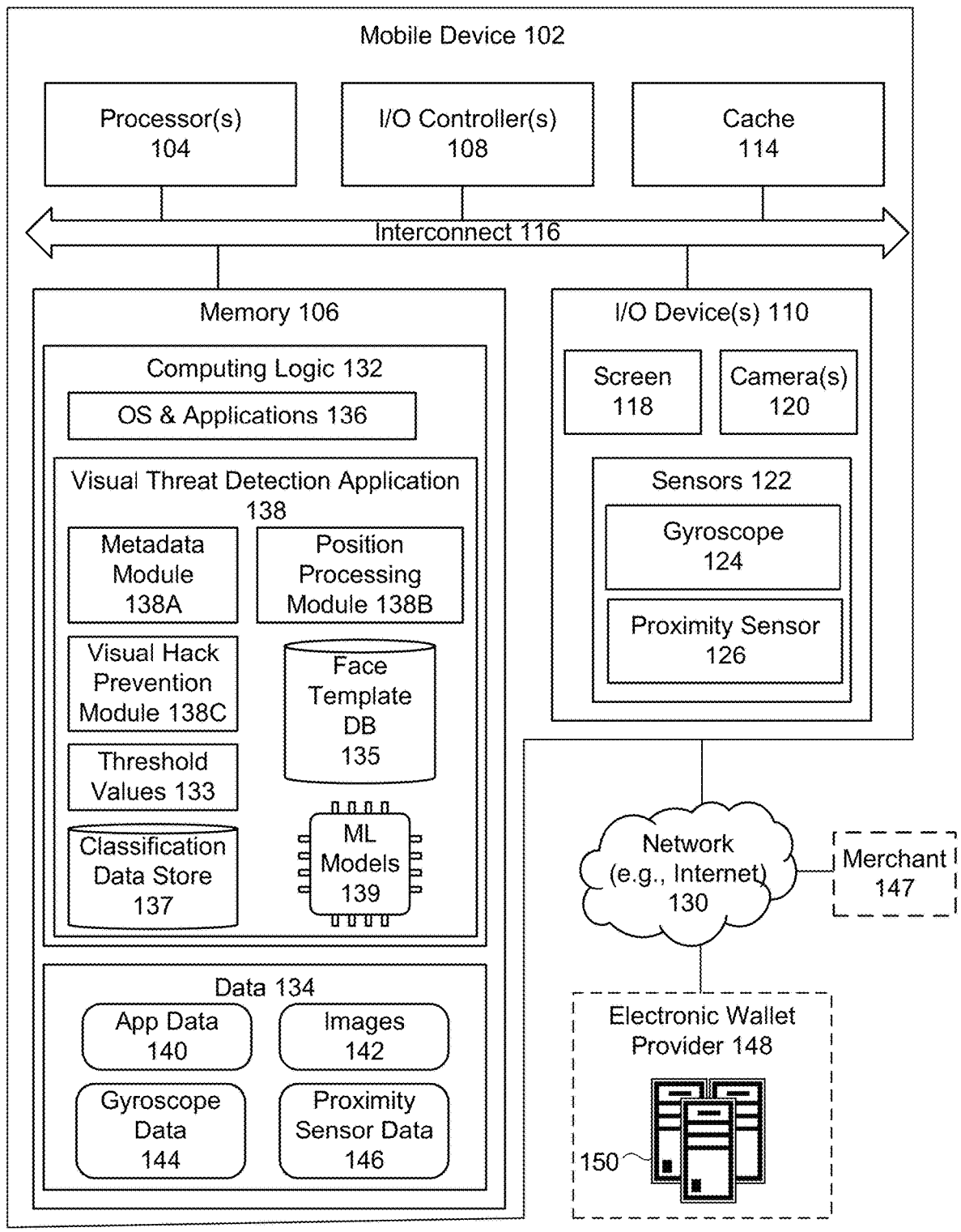
FIG. 1A is block diagram illustrating components of an anti-hacking system for a mobile device according to one embodiment.

The disclosed embodiments relate to methods and systems for preventing visual hacking of a mobile device. The following description is presented to enable one of ordinary skill in the art to make and use the invention and is provided in the context of a patent application and its requirements. Various modifications to the exemplary embodiments and the generic principles and features described herein will be readily apparent. The disclosed embodiments are mainly described in terms of particular methods and systems provided in particular implementations. However, the methods and systems will operate effectively in other implementations. Phrases such as "one embodiment" and "another embodiment" may refer to the same or different embodiments. The embodiments will be described with respect to systems and/or devices having certain components. However, the systems and/or devices may include more or less components than those shown, and variations in the arrangement and type of the components may be made without departing from the scope of the invention. The disclosed embodiments will also be described in the context of particular methods having certain steps. However, the method and system operate effectively for other methods having different and/or additional steps and steps in different orders that are not inconsistent with the exemplary embodiments. Thus, the disclosed embodiments are not intended to be limited to the embodiments shown, but is to be accorded the widest scope consistent with the principles and features described herein.

The disclosed embodiments provide methods and systems for preventing visual hacking of a mobile device. According to the disclosed embodiments, the solution comprises an anti-hacking application installed a mobile device that uses a combination of the mobile device's gyroscope, proximity sensor and camera to prevent hacking. When an application window displays a form on the screen of the mobile device, the anti-hacking application parses the form having one or more fields and uses labels of the fields to classify whether the form has at least one field that displays sensitive information. Responsive to the form being classified as including a field that displays sensitive information, the anti-hacking application i) accesses data from the gyroscope to detect roll and pitch viewing angles of the screen of the mobile device, ii) uses data from the proximity sensor to detect a distance between the screen of the mobile device and a face of the user, and iii) activates the camera to take an image of the user and detects a number of faces visible in the image. In some embodiments, the anti-hacking application may be configured to detect two out the three actions listed above. The anti-hacking application then obscures any of the sensitive information displayed in the field(s) responsive to: determining that the roll and pitch viewing angles are not within pitch and roll threshold values, or that the detected distance between the screen of the mobile device and the face of the user is not within distance threshold values, or that are multiple faces detected in the image. Otherwise, the anti-hacking application enables the application window to display the sensitive information in the fields of the form to the user.

FIG. 1A is block diagram illustrating components of an anti-hacking system 100 for a mobile device according to one embodiment. The mobile device 102 can be any mobile computer or a variety of other electronic devices that have portable functionality. Examples of a mobile device may include, but are not limited to, a cell phone, a smartphone, a tablet computer, a smartwatch, a pocket PC, an e-reader, a handheld gaming device, and a laptop. The mobile device 102 may include a processor(s) 104, a memory 106, I/O controller(s) 108, input/output (I/O) device(s) 110, and a cache memory 114, each coupled to an interconnect 116 (e.g., bus and system core logic). In addition, the processor 104 can be coupled to cache memory 409. In an embodiment, the interconnect 116 can connect the processor 104 and the memory 106 to the I/O device(s) 110 via I/O controller(s) 108. I/O devices 110 can include a display screen 118 and peripheral devices, such as camera(s) 120 (e.g., front (selfie) camera and a back (main) camera), and sensors 122. Sensor 122 may include, but are not limited to, a gyroscope 124 and a proximity sensor 126.

In an embodiment, the interconnect 116 can include one or more buses connected to one another through various bridges, controllers and/or adapters through which data and instructions (e.g. binary code signals) may travel to effect communications, operations, storage and the like. In one embodiment, the I/O controllers 108 can include a USB (Universal Serial Bus) adapter for controlling USB peripherals, an IEEE-1394 bus adapter for controlling IEEE-1394 peripherals, and wired or wireless network communication interfaces for electronic communication over a network 130 (e.g., the Internet). For example, the I/O devices 110 may include a transceiver connected to an antenna to effectuate wireless transmission or reception of various communication and/or sensor protocols (e.g., Wi-Fi, Bluetooth, FM, GPS, and the like). Although not shown, components of the mobile device 102 may be connected to an internal power source.

In an embodiment, the memory 106 can include one or more computer-readable media, e.g., ROM (Read Only Memory), volatile RAM (Random Access Memory), and non-volatile memory, such as hard drive, flash memory, etc. volatile RAM is typically implemented as dynamic RAM (DRAM). Non-volatile memory is typically a magnetic hard drive, a magnetic optical drive, an optical drive, or other type of persistent memory system. The non-volatile memory may also be a random access memory. The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In embodiments, the memory 106 may store a collection of both computing logic 132 and data 134. For example, computing logic 132 may comprise operating system (OS) and software applications 136, while the data 134 may include, but is not limited to: application data 140 generated or used by the OS and applications 136, images 142 captured by the camera(s) 120, gyroscope data 144 collected by the gyroscope 124, and proximity sensor data 146 collected by the proximity sensor 126.

During operation of the mobile device 102, the OS and applications 136 may display graphical user interface (GUIs) having windows or pages that may include data fields containing sensitive information, such as a displayed form, as one example, along with corresponding field labels describing the data fields. As used herein, the phrase "sensitive information" is data that needs to, or should, be guarded from unauthorized access and unwarranted disclosure in order to maintain the information security of an individual or organization. Any type of application may display sensitive information. Some non-limiting embodiments include a tax calculation application, a banking application, a spreadsheet or document application displaying user confidential information, and a shopping application or a web browsing displaying user or company confidential information.

For example, the computing logic 132 may include a wallet application, which may comprise an application program, server-side software, and/or databases for receiving and providing data to be used during a payment transaction with a merchant computer system 147 using the mobile device 102. The wallet application may also display or update account information provided by one or more servers 150 of an electronic wallet provider 148. As used herein, an "electronic wallet provider" may comprise an entity that provides and/or maintains electronic wallet mobile application for a user (e.g., a customer). Examples of an electronic wallet provider include, but are not limited to, Google Wallet™, Android Pay®, Apple Pay®, and Samsung Pay®. In some non-limiting examples, a financial institution (e.g., an issuer institution) may be an electronic wallet provider. The electronic wallet provider system may comprise computer systems, computer devices, and/or the like addition to the servers 150 operated by or on behalf of an electronic wallet provider.

Once payment account information is received from the wallet application by the merchant computer system 147, the merchant computer system 147 transmits a transaction authorization request to a payment processing network (not shown). The payment processing network may refer to an entity that receives transaction authorization requests from the merchants and other entities and provides guarantees of payment. The computer systems of the payment processing network may be organized into data processing subsystems, networks, and operations used to support and deliver payment related services (e.g., authentication services, authorization services, exception file services, and clearing and settlement services, etc.). Examples of a payment processing network may include a payment network such as Visa®, MasterCard®, American Express®, or any other entity that processes credit card transactions, debit card transactions, and other types of commercial transactions.

Figure 1B:
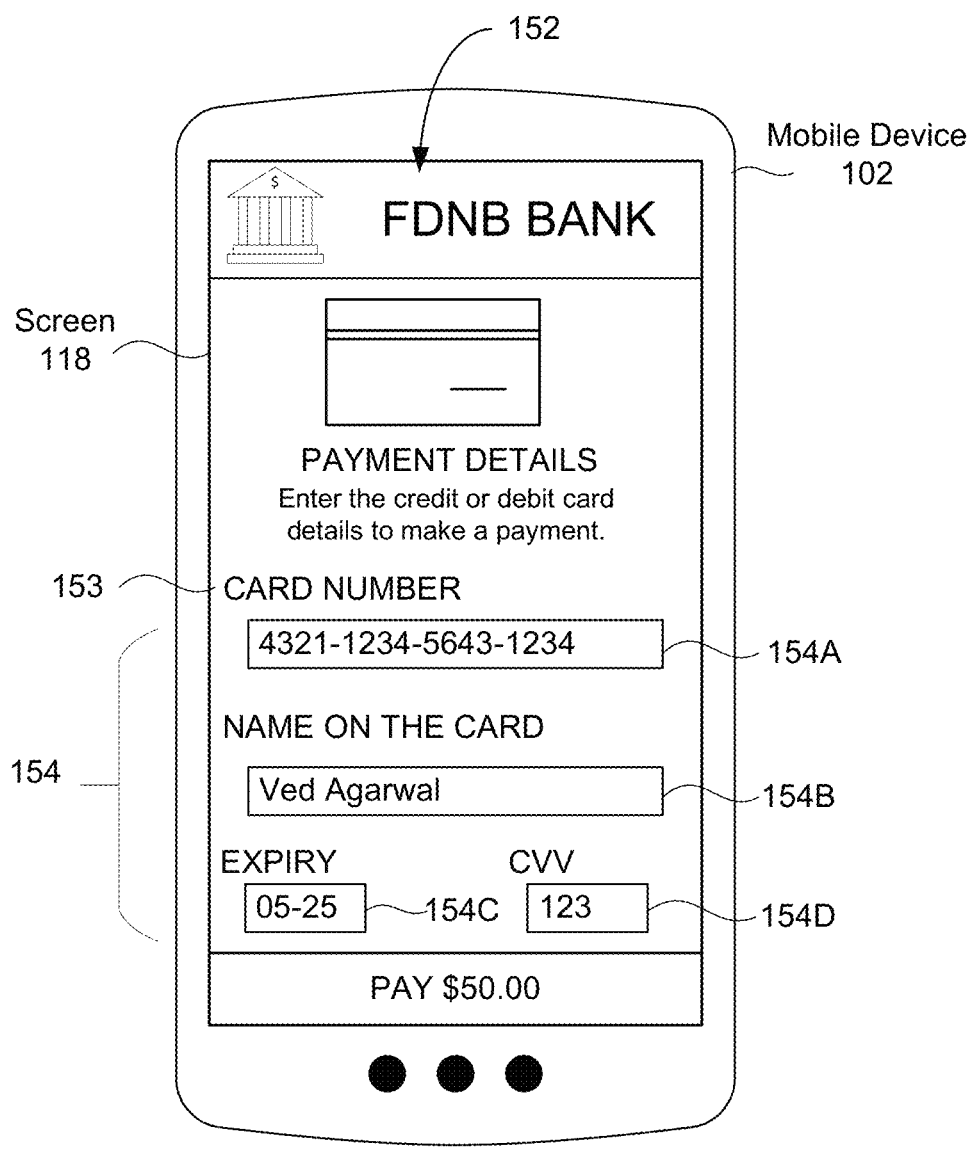
FIG. 1B is a diagram illustrating an example GUI displayed by an example wallet application on the screen of the mobile device.

FIG. 1B is a diagram illustrating an example GUI displayed by an example wallet application 152 on the screen 118 of the mobile device. In this example, a payment details screen is displayed with payment card detail fields 154 for the user to enter card payment details. The payment card detail fields 154 may have an associated label 153 (e.g., "CARD NUMBER"). In this example, the fields comprise a card number field 154A, a name on the card field 154B, a card expiry field 154C, and a CVV field 154D. The data entered and displayed in the payment card detail fields 154 represents sensitive or confidential information, as the user has a vested interest in safeguarding the data from credit card and/or stolen identity theft. However, entry and viewing of such information on the mobile device 102 is increasingly performed in public places. This can lead to security issues as people standing near the mobile device user can gain unauthorized access to the sensitive information through visual hacking or shoulder surfing. Unfortunately, there are currently little to no options for mobile device users to protect the display of sensitive information on the mobile device 102 from such visual hacking.

Referring again to FIG. 1A, the disclosed embodiments provide the mobile device with an anti-hacking application, referred to herein as a visual threat detection application (VTDA) 138, to protect mobile device users from visual hacking. In embodiments, the VTDA 138 is automatically activated when windows or pages are displayed on the screen 118 with data fields for viewing or entry of sensitive information. Once the VTDA 138 is activated, the VTDA 138 uses a combination of the gyroscope 124, the camera 120 and the proximity sensor 126 of the mobile device 102 to prevent or reduce a potential of visual hacking. In operation, the VTDA 138 i) uses the gyroscope 124 to detect horizontal and vertical viewing angles of the mobile device 102 as held by the user, 2) uses the proximity sensor 126 to detect a distance between the mobile device 102 and the user, and 3) causes the camera 120 to capture an image of the user and detects the number of faces in view (e.g., behind the user). If the VTDA 138 estimates that the mobile device 102 is not held at correct horizontal and vertical viewing angles, or is not held at a correct distance, or detects multiple faces/people in the captured image—suggesting the screen 118 might be visible to others, the VTDA 138 temporarily hides the sensitive information from view. In one embodiment, the VTDA 138 may hide the sensitive information from view until a predefined time limit is reached (e.g., 10 seconds to 3 minutes) or until the above conditions meet predefined thresholds. In one embodiment, the VTDA 138 may include a metadata module 138A, a position processing module 138B, and a visual hack prevention module 138C, as explained further below.

Figure 2A:
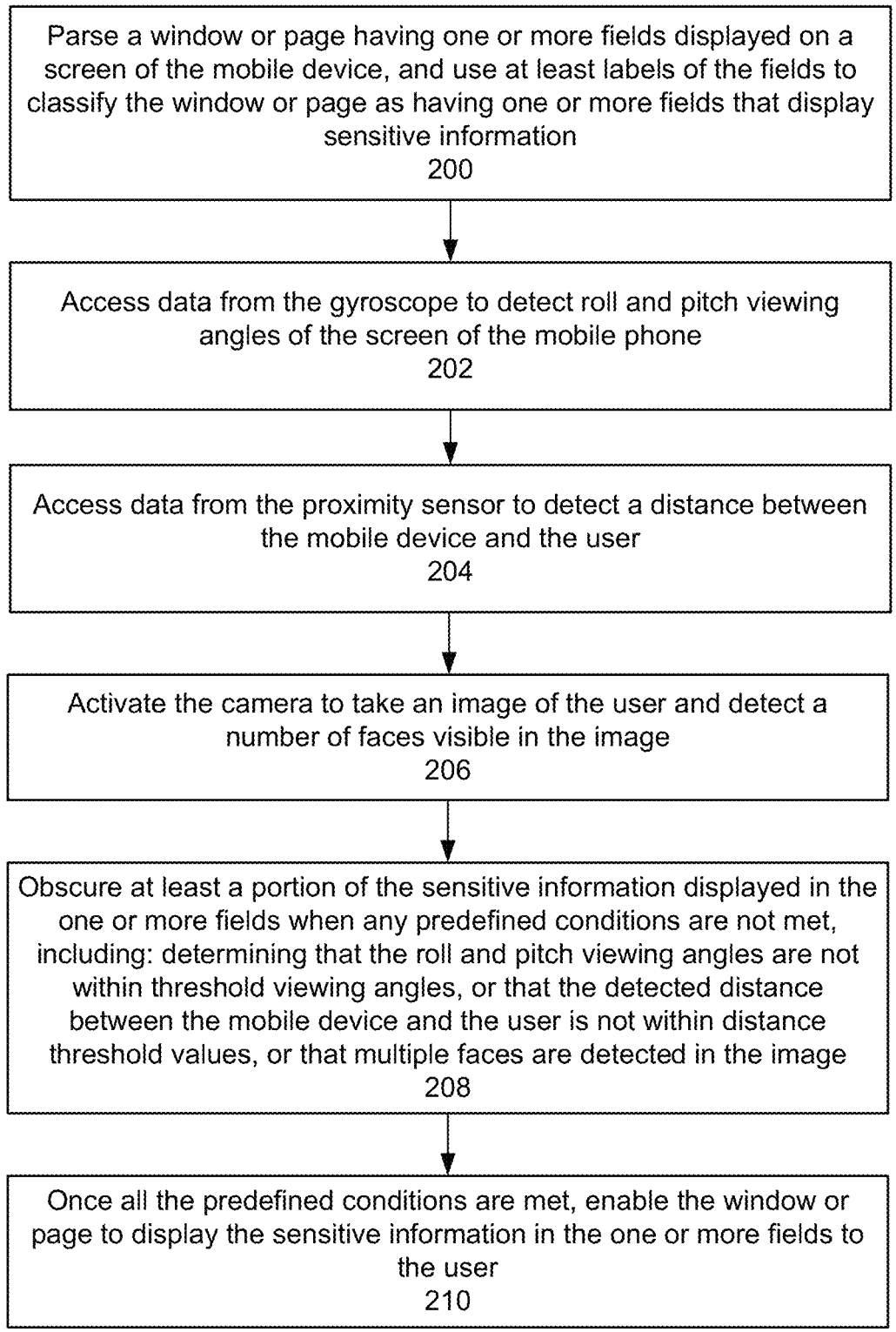
FIG. 2A is a flow diagram illustrating one embodiment of a process for preventing visual hacking of a mobile device performed by a visual threat detection application.

FIG. 2A is a flow diagram illustrating one embodiment of a process for preventing or reducing visual hacking of a mobile device performed by the visual threat detection application (VTDA) 138 executing on processor 104. The process may begin by parsing a window or page having one or more fields 154 displayed on the screen 118 of the mobile device 102, and using at least labels of the fields to classify the window or page as having one or more fields that display sensitive information (block 200).

The VTDA 138 accesses the gyroscope data 144 from by the gyroscope 124 to detect roll and pitch viewing angles of the screen 118 of the mobile device 110 (block 202). The VTDA 138 accesses the proximity sensor data 146 from the proximity sensor 126 to detect a distance between the mobile device 102 and the user (block 204). The VTDA 138 activates a camera 120 of the mobile device 102 to take an image of the user, which is stored with the images 142, and detects a number of faces visible in the image (block 206).

The VTDA 138 then compares the sensor data to a plurality of threshold values 133 (FIG. 1) and obscures at least a portion of the sensitive information displayed in the fields 154 when any predefined conditions are not met, including: determining that the roll and pitch viewing angles are not with pitch and roll threshold values, or that the detected distance between the mobile device 102 and the user is not within distance threshold values, or that multiple faces are detected in the image (block 208). Once all the predefined conditions are met, the VTDA 138 enables the window or page to display the sensitive information in the fields 154 of the window or page to the user (block 210).

Figure 2B:
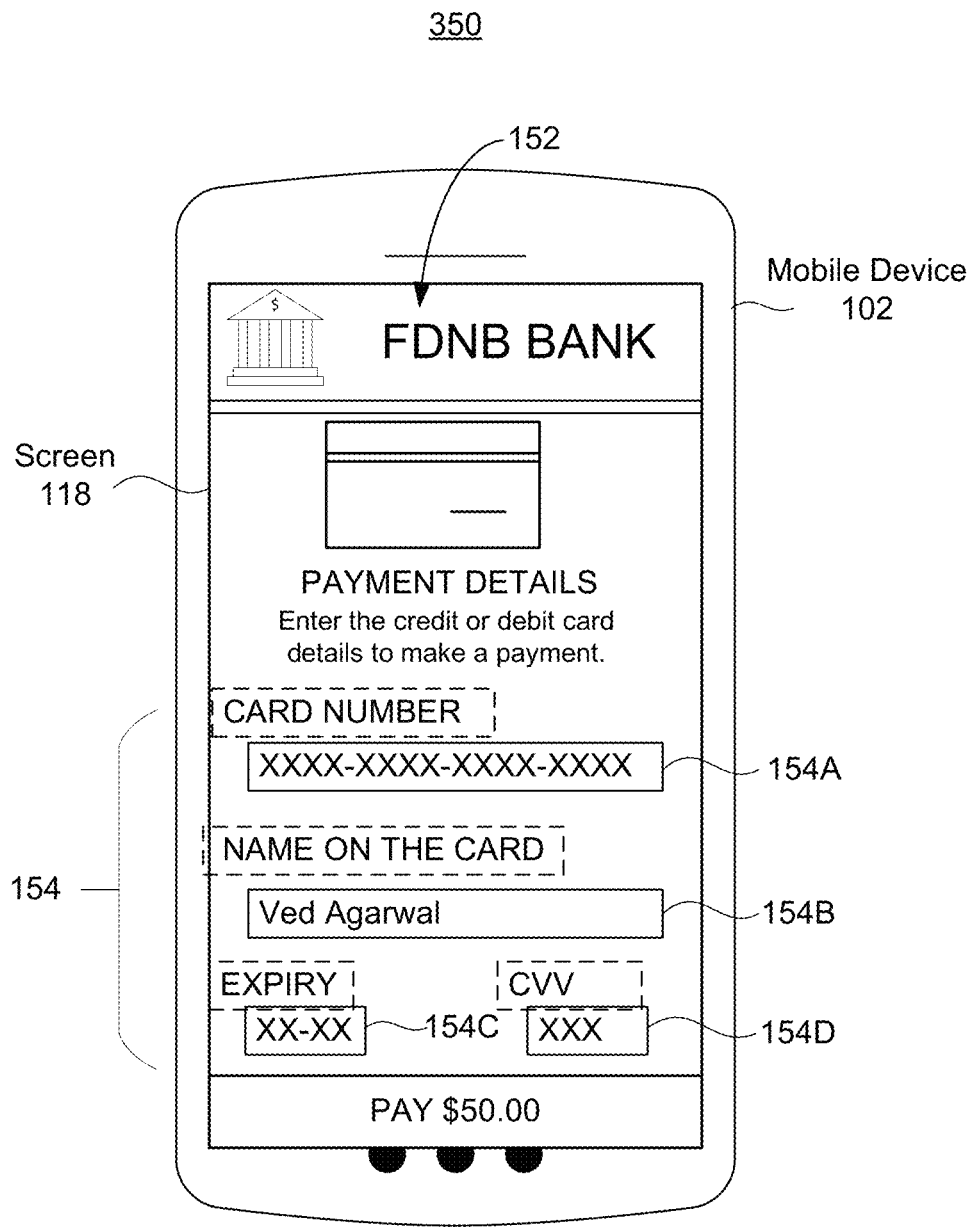
FIG. 2B is a diagram illustrating an example GUI displayed by the example wallet application on the screen of the mobile device after processing by the VTDA of the disclosed embodiments.

FIG. 2B is a diagram illustrating an example GUI displayed by the example wallet application 152 on the screen 118 of the mobile device 102 after processing by the VTDA of the disclosed embodiments. Continuing with the example from FIG. 2A, after processing by the VTDA 138, the payment details screen is still displayed with payment card detail fields 154 for the user to enter card payment details. However, in this example, the VTDA 138 has determined that the viewing environment for the mobile device 102 is unsafe and has obscured display of the sensitive information. In this case, the VTDA 138 has determined that all the fields 154 except the name on the card field 154B displays sensitive information. Accordingly, the VTDA 138 obscures or hides at least a portion of the sensitive information in fields 154A, 154C and 154D.

In this example, characters of the sensitive information have been replaced with an "X", but any type of characters, numbers, graphics or shading may be used to obscure the sensitive information. Once the VTDA 138 determines that the viewing angles and distance of the mobile device 102 meet the thresholds and that only one face is detected in the captured image, the VTDA 138 enables the wallet application to display the sensitive information, as shown in FIG. 1B.

Figure 3:
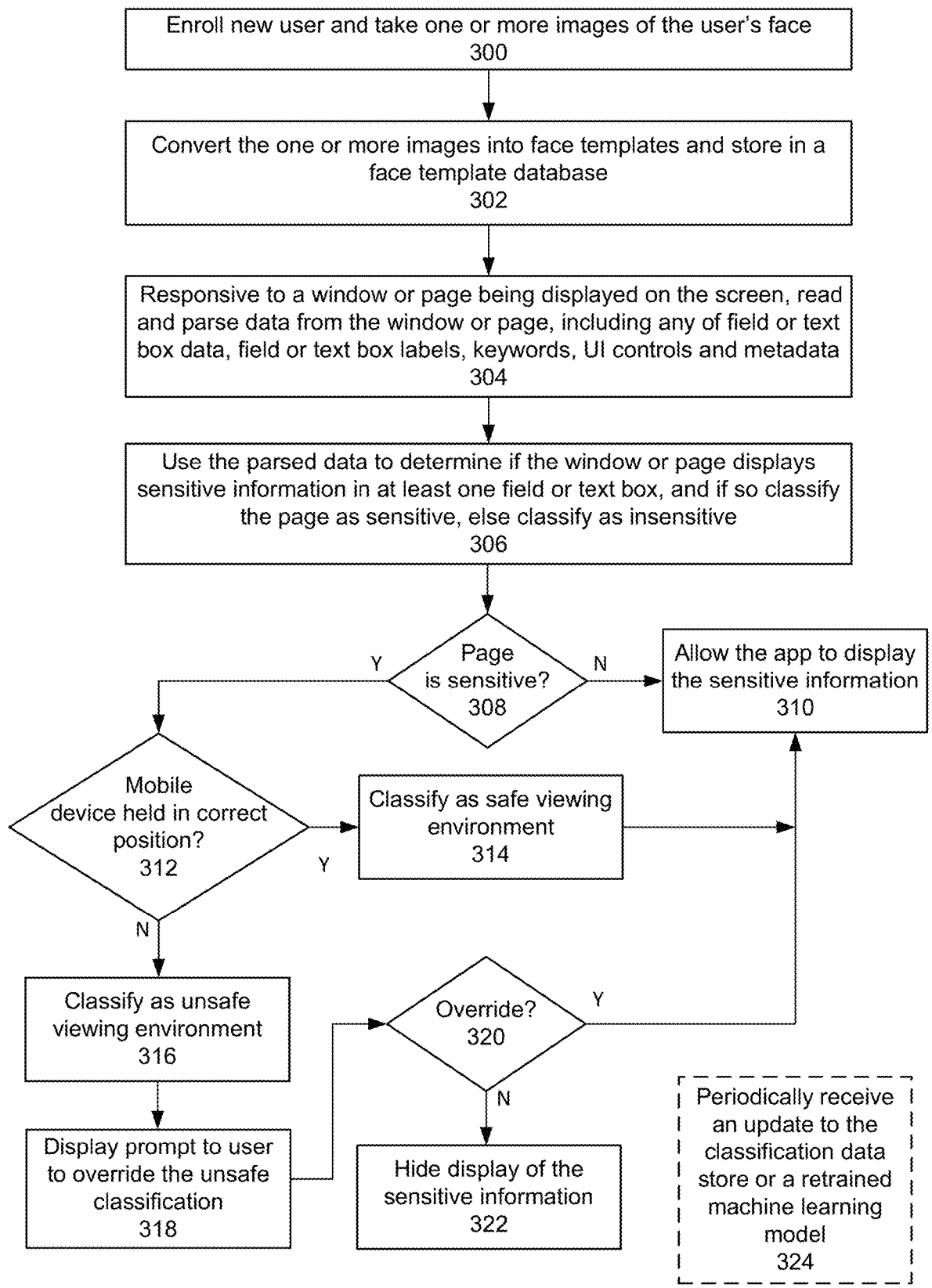
FIG. 3 is a flow diagram illustrating the process for preventing visual hacking of a mobile device in further detail.

FIG. 3 is a flow diagram illustrating the process for preventing visual hacking of a mobile device in further detail. Once invoked for the first time or a user indicates they a new user, the VTDA 138 begins an enrollment process to enroll in the new user, including taking one or more images of the user's face (block 300). In one embodiment, the user may input personal information followed by the VTDA 138 activating the front camera and prompting the user to take one or more portrait images of the user. The enrollment process further includes converting the one or more portrait images into one or more face templates and storing the face templates in a face template database 135 (block 302).

Responsive to a window or page being displayed on the screen by another application or the OS, the VTDA 138 may invoke the metadata module 138A to read and parse data from the window or page, including any of field or text box, field or text box labels, keywords, UI controls and metadata (block 304). In embodiments, the fields or box data may contain any of alphabetic characters (A through Z), numeric characters (0 through 9), national characters (at sign @, dollar sign $, pound sign #), and special characters (ampersand &, asterisk *, blank, braces { }, brackets [ ]).

The metadata module 138A determines from the parsed data whether the window or page displays sensitive information in any of the fields or text boxes, and if so classify the page as sensitive, otherwise the page is classified as insensitive (block 306). For example, if the page contains labels including, but not limited to, ID, login name, username, password, account or card number, CVV, Social Security number, and the like, the metadata module 138A classifies the page as sensitive and requiring threat protection.

In one embodiment, the metadata module 138A may search for the parsed to data (e.g. labels, keywords, and metadata) in a classification data store 137 (FIG. 1) containing labels, keywords, and metadata that indicate, or are associated, with types of sensitive information. A match indicates the page displays sensitive information and needs protection, while a non-match indicates the page does not display sensitive information and is safe or insensitive. The metadata module 138A may output a classification that indicates the page is insensitive because the page contains no sensitive information, or that the page is sensitive because the page contains sensitive information (e.g., "1"=page sensitive or "0"=page insensitive). In another embodiment, the metadata module 138A may use one or more of the machine learning (ML) models 139 (see FIG. 1) that are trained to process the parsed data and return a classification of whether the page is sensitive or in-sensitive.

If the window or webpage is classified as insensitive (block 308), then the VTDA 138 takes no action, and the application displays the sensitive information (block 310).

If the window or webpage is classified as sensitive (block 308), then the VTDA 138 may call the position processing module 138B to determine if the mobile device 102 is held a correct position (block 312). In one embodiment, this may be accomplished by comparing current sensor data with stored threshold values, as expired further below. If it is determined the mobile device 102 is held in the correct position (block 312), then the position processing module 138B classifies the viewing environment to be safe (block 314). The process then proceeds with the VTDA 138 allowing the application to display the sensitive information (block 310).

If it is determined the mobile device 102 is not held in a correct position (block 312), then the position processing module 138B classifies the viewing environment to be unsafe (block 316). The VTDA 138 may optionally display an override prompt to the user with a UI element to enable the user to override the unsafe viewing environment classification (block 318). In one embodiment, the override prompt may be displayed as a floating button (e.g., "Override Threat Protection") over the window or webpage.

If the override prompt is activated (block 320), the VTDA 138 allows the application to display the sensitive information (block 310). If the override prompt is not pressed (block 320), the VTDA 138 hides the display of the sensitive information (block 322). In one embodiment, the VTDA 138 may call the visual hack prevention module 138C to hide/block the display of the sensitive information, as described with respect to FIG. 5.

In addition, at any point of the process, the VTDA 138 may periodically receive an update to the classification data store 137 or a retrained ML model 139 based on new keywords, labels and the like (block 324). The updates may be received by the mobile device 102 over the network 130 from the servers 150 of the electronic wallet provider 148 or a third party.

Figure 4A:
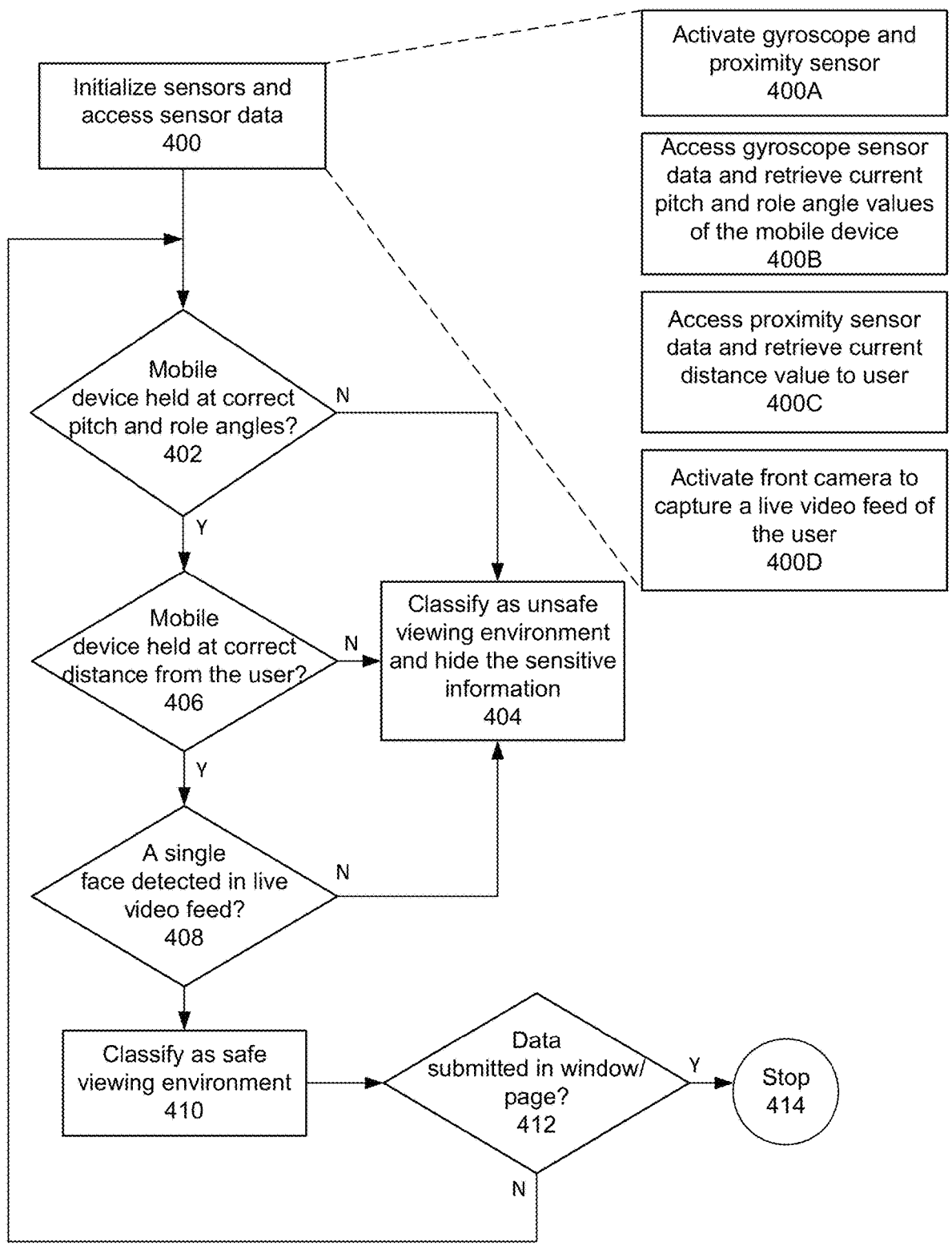
FIG. 4A is a flow diagram illustrating a process performed by the position processing module of the visual threat detection application to determine if the mobile device is held a correct position.

FIG. 4A is a flow diagram illustrating a process performed by the position processing module 138B of the visual threat detection application 138 to determine if the mobile device 102 is held a correct position corresponding to block 312 of FIG. 3. Once the position processing module 138B is activated, the position processing module 138B initializes the sensors 122 and accesses the sensor data (block 400). More specifically, the position processing module 138B activates the gyroscope 124 and the proximity sensor 126 (block 400A). The position processing module 138B accesses the gyroscope data 144 and retrieves current pitch and roll angle values of the mobile device 102 (block 400B). The position processing module 138B accesses the proximity sensor data 146 and retrieves the current distance value to the user (block 400C). The position processing module 138B also activates the front camera 120 to capture live video feed of the user (block 400D).

After the sensors are initialized, the position processing module 138B determines if the mobile device 102 is held a correct pitch and roll angles (block 402). In one embodiment, this may be performed by comparing the current pitch angle value and roll angle value accessed from the gyroscope data 144 to pitch and roll threshold values, which are part of the threshold values 133. In one embodiment, the pitch and roll threshold values comprise a pitch angle between 0 to 70° and a roll angle between −45 to 45°.

Figure 4B:
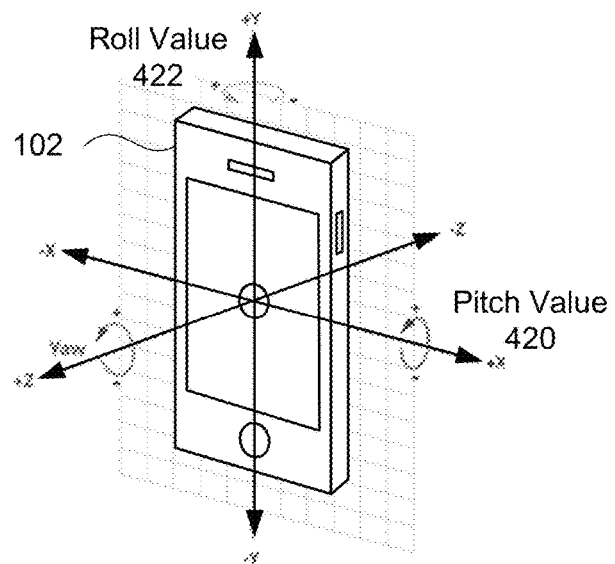
FIG. 4B is a diagram illustrating an example of a pitch angle value and a roll angle value of the mobile device.

FIG. 4B is a diagram illustrating an example of a pitch angle value 420 and a roll angle value 422 of the mobile device 102.

Referring again to FIG. 4A, if the current pitch angle value 420 and roll angle value 422 are not within the pitch and roll threshold values (block 402), then the viewing environment is classified as unsafe and the sensitive information is hidden (block 404). In embodiments, once the viewing environment has been classified as unsafe, the visual hack prevention module 138C may be called to mask and hide the sensitive information, as described with reference to FIG. 5.

If the current pitch angle value 420 and roll angle value 422 are within the pitch and roll threshold values (block 402), then the position processing module 138B determines if the mobile device is held a correct distance from the user (block 406). In one embodiment, this may be performed by comparing the current distance value to a distance threshold values, which are part of the threshold values 133. In one embodiment, the distance threshold values comprise a distance between 25 to 65 centimeters.

Figure 4C:
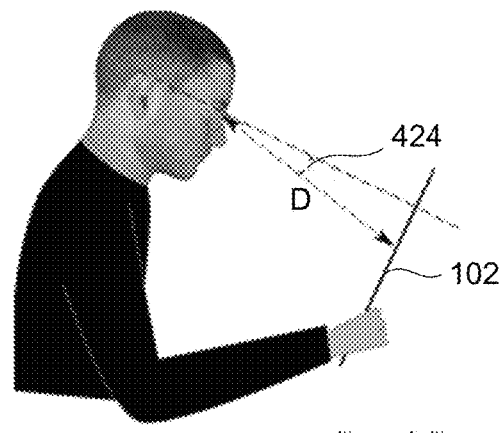
FIG. 4C is a diagram illustrating an example of a current distance value "D" between the user and the mobile device.

FIG. 4C is a diagram illustrating an example of a current distance value "D" between the user and the mobile device 102. In addition to the distance value "D", an eye tracking feature may be used to track the user's eye's to determine a viewing angle 424 between the user's eye's and the mobile device 102, which also may be compared to a threshold angle value to aid in determining if the mobile device is held a correct distance from the user.

Referring again to FIG. 4A, if the current distance value D is not within the distance threshold values, then the viewing environment is classified as unsafe and the sensitive information is hidden (block 404).

If the current distance value is within the distance threshold values (block 406), then the position processing module 138B determines if only a single face is detected in the live video feed (block 408). If more than one face is detected in the live video feed, then the viewing environment is classified as unsafe and the sensitive information is hidden (block 404). Otherwise, the position processing module 138B classifies the viewing environment as safe (block 410).

Figure 4D:
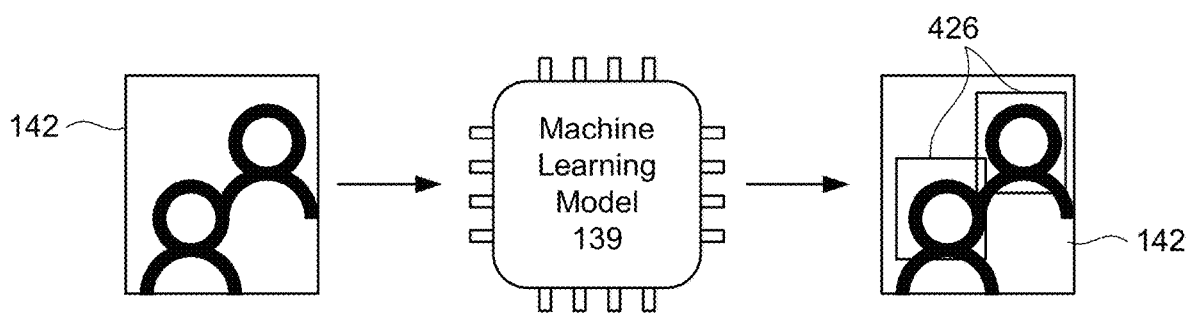
FIG. 4D is a diagram illustrating an example of a determination of whether only a single face is detected in the live video feed.

FIG. 4D is a diagram illustrating an example of a determination of whether only a single face is detected in the live video feed. In one embodiment, the position processing module 138B may input the live video feed of images 142 from the memory 106 into one or more of the machine learning (ML) models 139 that are trained to process images to detect faces 426 in the images 142. The output of the ML model(s) 139 may be the number of faces detected, which would be two in this example.

For further security and in a further embodiment, the position processing module 138B may be configured to use the face templates stored in the face template database 135 (FIG. 1) to perform face recognition on the detected faces in the images 142. If only one face is detected, then the position processing module 138B may convert the current image of the detected face into a current face template and determine the detected face matches one of the face templates in the face template database 135. If not, the viewing environment is classified as unsafe.

Referring again to FIG. 4A, the position processing module 138B determines if the user has submitted the sensitive data in the window/page or if the window/page has been closed (block 412). If not, the position processing module 138B continues to monitor and classify the viewing environment at block 402. Once the data is submitted in the window/page, the process stops 414. It should be understood that processing of blocks 402, 406, 408 is order independent.

Figure 5:
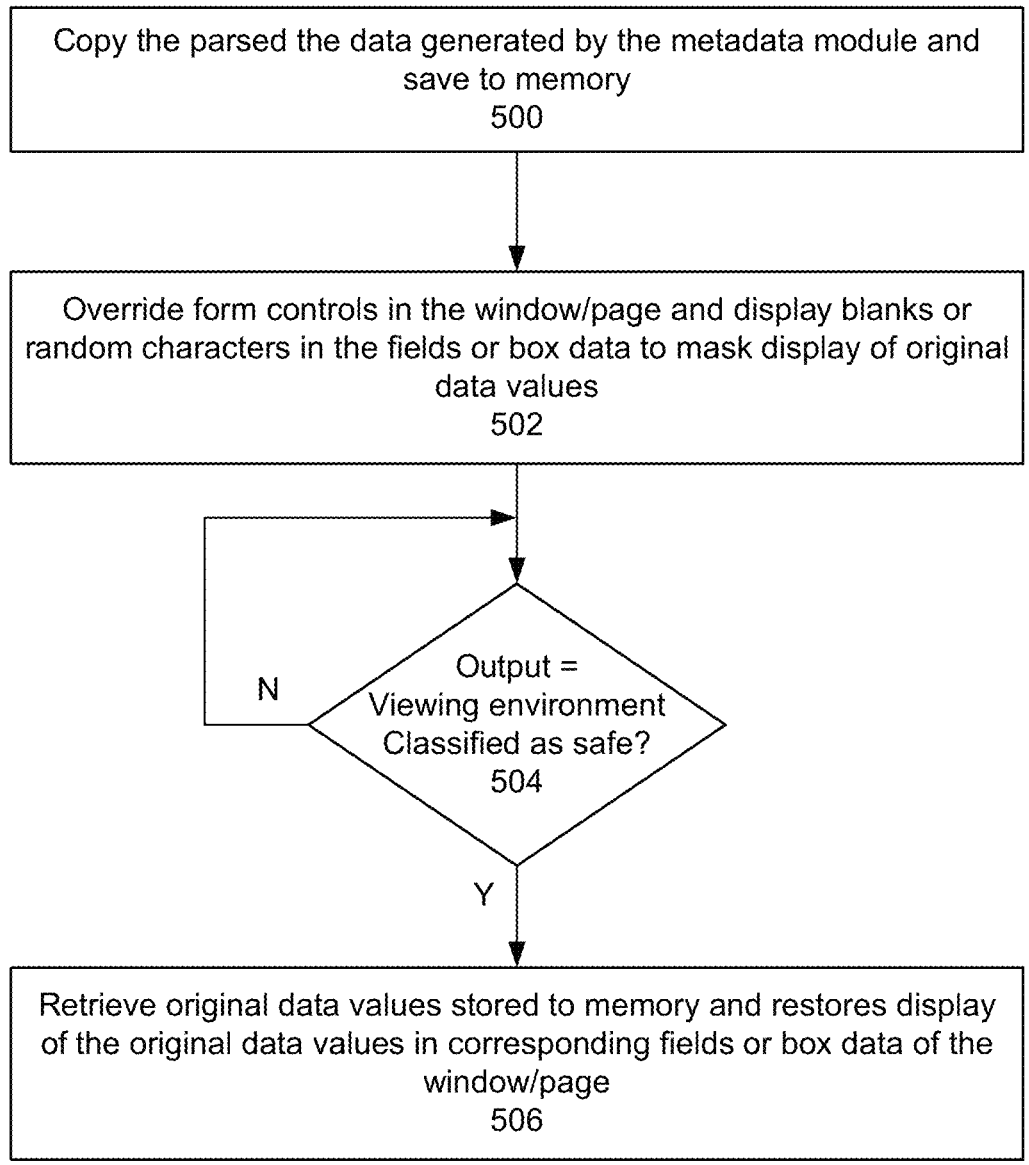
FIG. 5 is diagram illustrating a process performed by the visual hack prevention module of the visual threat detection application according to one embodiment.

FIG. 5 is diagram illustrating a process performed by the visual hack prevention module 138C of the visual threat detection application 138 according to one embodiment. In one embodiment, the visual hack prevention (VHP) module 138C is invoked when the position processing module 138B outputs a classification that the viewing environment as unsafe. Once invoked, the VHP module 138C copies the parsed data (field or text boxes, field or text box labels, keywords, UI controls and metadata) generated by the metadata module 138A, and saves the parsed data in memory 106 (block 500).

The VHP module 138C overrides form controls in the window/page and displays blanks or random characters in the fields or box data to obscure or mask display of original data values determined to be sensitive (block 502). In the example shown in Figure B, the VHP module 138C obscures the sensitive information by replacing the characters comprising the original data with an "X", but any type of characters, numbers, graphics or shading may be used to obscure the sensitive information.

Referring again to FIG. 5, the VHP module 138C determines if the output of the position processing module 138B has changed to classify the viewing environment as safe (block 504). If so, the VHP module 138C retrieves the original data value stored to memory and restores display of the original data values in corresponding fields or box data of the window/page (block 506). The result of this process is illustrated in FIG. 1B where all the original data is displayed in the window/page.

Methods and systems for preventing visual hacking of a mobile device have been disclosed. According to embodiments, the visual threat detection application 138 automatically protects the user viewing sensitive information from unauthorized access through third-party shoulder surfing and maintains information security.

In this description, some functions and operations are described as being performed by or caused by software code to simplify description. However, such expressions are also used to specify that the functions result from execution of the code/instructions by a processor, such as a microprocessor. Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system. While one embodiment can be implemented in fully functioning computers and computer systems, various embodiments are capable of being distributed as a computing product in a variety of forms and are capable of being applied regardless of the particular type of machine or non-transitory computer-readable media used to actually effect the distribution.

At least some disclosed aspects can be embodied, at least in part, in software, e.g., the VTDA 138. That is, the techniques may be carried out in a computer system or other data processing system in response to processor 104 executing sequences of instructions contained in a non-transitory storage medium or memory 106, such as ROM, volatile RAM, non-volatile memory, cache 114 or a remote storage device. Routines executed to implement the embodiments may be implemented as part of the operating system or a specific application, component, program, object, module or sequence of instructions referred to as "applications" or "computer programs." The computer programs typically include one or more instructions set at various times in various memory and storage devices in a computer, and that, when read and executed by one or more processors in a computer, cause the computer to perform operations necessary to execute elements involving the various aspects.

A method and system for preventing visual hacking of a mobile device has been disclosed. The present invention has been described in accordance with the embodiments shown, and there could be variations to the embodiments, and any variations would be within the spirit and scope of the present invention. Accordingly, many modifications may be made by one of ordinary skill in the art without departing from the spirit and scope of the appended claims.

I claim:

1. A mobile device, comprising:
   a gyroscope;
   a proximity sensor;
   a camera;
   a screen;
   a memory; and
   a processor executing an anti-hacking application, which when executed is configurable to cause the processor to:
   parse a window or page having one or more fields displayed on the screen, and use at least labels of the one or more fields to classify the window or page as having one or more fields that display sensitive information;
   responsive to determining that the one or more fields display sensitive information:
      access data from the gyroscope to detect roll and pitch viewing angles of the screen of the mobile device;
      access data from the proximity sensor to detect a distance between the mobile device and a user;
      activate the camera to take a single image of the user and detect a number of faces visible in the image;
   obscure at least a portion of the sensitive information displayed in the one or more fields when any predefined conditions are not met, including: determining that the roll and pitch viewing angles are not within pitch and roll threshold values, or that a detected distance between the mobile device and the user is not within distance threshold values, or that multiple faces are detected in the image; and once all the predefined conditions are met, enable the window or page to display the sensitive information in the one or more fields to the user.

2. The mobile device of claim 1, wherein the window or page is displayed by a graphical user interface of an operating system or an application, the window or page comprising one or more data fields and corresponding field labels.

3. The mobile device of claim 1, wherein the portion of the sensitive information displayed in the one or more fields is obscured until a predefined time limit is reached or until the roll and pitch viewing angles are within the pitch and roll threshold values and that the detected the distance between the mobile device and the user is within the distance threshold values.

4. The mobile device of claim 1, wherein once invoked for a first time or the user indicates they a new user, the anti-hacking application enrolls the new user, including taking one or more images of a face of the user, converting the one or more images into one or more face templates, and storing the one or more face templates in a face template database.

5. The mobile device of claim 1, wherein the anti-hacking application searches for the parsed to data in a classification data store of labels, keywords, and metadata that indicate or are associated with the sensitive information, wherein a match indicates the window or page displays the sensitive information and needs protection, while a non-match indicates the window or page does not display the sensitive information and is safe or insensitive.

6. The mobile device of claim 1, wherein the anti-hacking application uses one or more of machine learning (ML) models that are trained to process the parsed data and return a classification of whether the window or page is sensitive or in-sensitive.

7. The mobile device of claim 1, wherein responsive to determining that the roll and pitch viewing angles are within the pitch and roll threshold values, and that the detected distance between the mobile device and the user is within the distance threshold values, and detecting a single face in the image, allowing an application to display the sensitive information.

8. The mobile device of claim 1, wherein the anti-hacking application classifies a viewing environment to be unsafe responsive to determining that the roll and pitch viewing angles are not within the pitch and roll threshold values, or that the detected distance between the mobile device and the user is not within the distance threshold values, or that multiple faces are detected in the image, and displays an override prompt to the user with a UI element to enable the user to override the unsafe viewing environment classification and view the sensitive information.

9. A method, comprising:
parsing, by a processor of a mobile device, a window or page having one or more fields displayed on a screen of the mobile device, and using at least labels of the one or more fields to classify the window or page as having one or more fields that display sensitive information;
responsive to determining that the one or more fields display sensitive information:
accessing, by the processor, data from a gyroscope of the mobile device to detect roll and pitch viewing angles of the screen of the mobile device;
accessing, by the processor, data from a proximity sensor to detect a distance between the mobile device and a user;
activating a camera to take a single image of the user and detect a number of faces visible in the image;
obscuring at least a portion of the sensitive information displayed in the one or more fields when any predefined conditions are not met, including: determining that the roll and pitch viewing angles are not within pitch and roll threshold values, or that the detected distance between the mobile device and the user is not within distance threshold values, or that multiple faces are detected in the image; and
once all the predefined conditions are met, enabling the window or page to display the sensitive information in the one or more fields to the user.

10. The method of claim 9, further comprising displaying the window or page by a graphical user interface of an operating system or an application, the window or page comprising one or more data fields and corresponding field labels.

11. The method of claim 9, further comprising obscuring the portion of the sensitive information displayed in the one or more fields until a predefined time limit is reached or until the roll and pitch viewing angles are within the pitch and roll threshold values angles and that the detected the distance between the mobile device and the user is within the distance threshold values.

12. The method of claim 9, further comprising once invoked for a first time or the user indicates they a new user, enrolling the new user, including taking one or more images of a face of the user, converting the one or more images into one or more face templates, and storing the one or more face templates in a face template database.

13. The method of claim 9, further comprising searching for the parsed to data in a classification data store of labels, keywords, and metadata that indicate or are associated with the sensitive information, wherein a match indicates the window or page displays the sensitive information and needs protection, while a non-match indicates the window or page does not display the sensitive information and is safe or insensitive.

14. The method of claim 9, further comprising using one or more of machine learning (ML) models that are trained to process the parsed data and return a classification of whether the window or page is sensitive or in-sensitive.

15. The method of claim 9, further comprising responsive to determining that the roll and pitch viewing angles are within the pitch and roll threshold values, and that the detected distance between the mobile device and the user is within the distance threshold values, and that a single face is detected in the image, allowing an application to display the sensitive information.

16. The method of claim 9, further comprising classifying a viewing environment to be unsafe responsive to determining that the roll and pitch viewing angles are not within the pitch and roll threshold values, or that the detected distance between the mobile device and the user is not within the distance threshold values, or that multiple faces are detected in the image, and displaying an override prompt to the user with a UI element to enable the user to override the unsafe viewing environment classification and view the sensitive information.

17. A non-transitory computer-readable medium containing program instructions for protecting a mobile device users from visual hacking, the program instructions when executed by a processor of the mobile device, cause the processor to:
automatically activate an anti-hacking application when the processor displays a window or page on a screen of the mobile device that includes one or more data fields for viewing or entry of sensitive information; and responsive to determining that the one or more fields display sensitive information:

using, by the anti-hacking application, a combination of a gyroscope, a camera and a proximity sensor of the mobile device to reduce a potential of visual hacking by:

using the gyroscope to detect horizontal and vertical viewing angles of the mobile device as held by a user;

using the proximity sensor to detect a distance between the mobile device and the user;

causing the camera to capture a single image of the user and detecting a number of faces in the image; and responsive to the anti-hacking application detecting that the mobile device is not held at correct horizontal and vertical viewing angles or is not held at a correct distance, or detecting multiple faces in the image, temporarily hiding the sensitive information from view.

18. The non-transitory computer-readable medium of claim 17, wherein the anti-hacking application begins by parsing the data fields displayed on the screen of the mobile device, and using at least labels of the one or more data fields to classify the window or page as having one or more fields that display the sensitive information.

19. The non-transitory computer-readable medium of claim 17, wherein the anti-hacking application compares the horizontal and vertical viewing angles to pitch and roll threshold values and compares the distance to distance threshold values.

20. The non-transitory computer-readable medium of claim 19, wherein the anti-hacking application hides the sensitive information from view responsive to determining that the horizontal and vertical viewing angles are not with pitch and roll threshold values, or that the detected distance between the mobile device and the user is not within the distance threshold values.

* * * * *